United States Patent Office 3,100,767
Patented Aug. 13, 1963

3,100,767
WATER-SOLUBLE DISAZO DYESTUFFS
Raymond Gunst, Binningen, Switzerland, assignor to Ciba Company, Inc., Fair Lawn, N.J.
No Drawing. Filed Aug. 7, 1959, Ser. No. 832,167
Claims priority, application Switzerland Aug. 11, 1958
5 Claims. (Cl. 260—153)

This invention provides valuable new azo-dyestuffs which contain at least two strongly acid groups imparting solubility in water and which correspond to the formula (1)
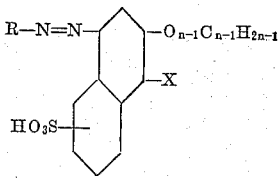

in which R represents the radical of a diazo-component free from azo-linkages, and advantageously the radical of a benzene or naphthalene sulfonic acid, $n$ represents the whole number 1 or 2, X represents the radical of a halogenated 1:3:5-triazine of the formula

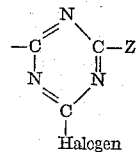

bound through an amino-bridge, and especially an —NH— bridge, in which formula Z represents the radical of a dyestuff bound through an —NH— bridge. The invention provides more especially monoazo-dyestuffs of the above formula, which contain a 2-chloro-4-amino-1:3:5-triazine radical of the formula

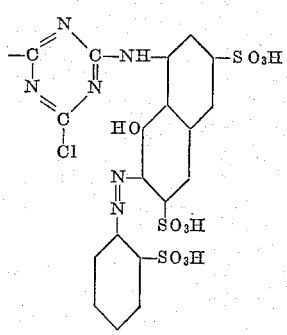

The invention also provides a process for the manufacture of the aforesaid dyestuffs, wherein a trihalogen-1:3:5-triazine, especially 2:4:6-trichloro-1:3:5-triazine, is condensed, on the one hand, with an amino-monoazo-dyestuff of the formula (2)
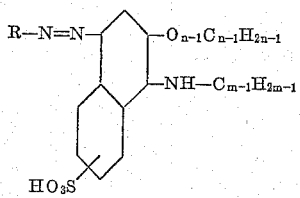

in which R and $n$ have the meanings given for Formula 1, and $m$ is the whole number 1, 2 or 3, and, on the other with an amine of dyestuff character in such manner that a halogenated triazine condensation product is obtained.

For making the starting dyestuffs of the Formula 2 there are used as coupling components, for example, 2-methoxy-1-aminonaphthalene-6-sulfonic acid and more especially 1-aminonaphthalene-6- or -7-sulfonic acid.

The diazo-components to be coupled with the above coupling components may contain substituents that do or do not impart solubility in water, for example, strongly acid substituents imparting solubility in water, such as sulfonic acid groups. These diazo-components may be either relatively simple compounds, for example, aminobenzenes, and sulfonic acids thereof, aminonaphthalene sulfonic acid, aminopyrene- or aminochrysene-sulfonic acids or aminonaphthol sulfonic acids, or they may be more complicated diazo-compounds free from azo linkages.

As examples of amines of which the diazo-compounds may be coupled with the aforesaid coupling components containing acylatable amino groups there may be mentioned, for example:

1-aminobenzene-2-, -3- or -4-sulfonic acid,
1-aminobenzene-2-, -3- or -4-carboxylic acid,
2-amino-1-methoxybenzene-4-sulfonic acid,
1-amino-4-methoxybenzene-2-sulfonic acid,
3-amino-2-hydroxy-benzoic acid-5-sulfonic acid,
3-amino-6-hydroxybenzoic acid-5-sulfonic acid,
2-methoxy- or 2-methyl-1-aminobenzene-4-sulfonic acid,
5-acetylamino-2-aminobenzene-1-sulfonic acid,
4-acetylamino-2-aminobenzene-1-sulfonic acid,
4-acetylamino-2-methyl-5-methoxy-1-aminobenzene,
5-acetylamino- or 5-benzoylamino-2-aminobenzene-1-carboxylic acid,
5-amino-2-nitrobenzoic acid,
2:4-dimethyl-1-aminobenzene-6-sulfonic acid,
2-methyl-4-chloro-1-aminobenzene-6-sulfonic acid,
2-aminobenzoic acid-4- or -5-sulfonic acid,
1-aminonaphthalene-4-, -5-, -6- or -7-sulfonic acid,
2-aminonaphthalene-4-, -6-, -7- or -8-sulfonic acid,
1-aminonaphthalene-3:6-disulfonic acid,
1-aminobenzene-2:5-disulfonic acid,
2-aminonaphthalene-4:8-, -5:7- or -6:8-disulfonic acid,
1-(3'- or 4'-aminobenzoyl)-aminobenzene-3-sulfonic acid,
3-aminopyrene-8- or -10-monosulfonic acid,
3-aminopyrene-5:8- or -5:10-disulfonic acid,
4-nitro-4'-aminostilbene-2:2'-disulfonic acid, and also
O-acyl-derivatives of aminonaphthol sulfonic acids, for example,
O-acyl derivatives of 1-amino-8-hydroxynaphthalene-3:6- or -4:6-disulfonic acid, dehydrothiotoluidine mono- or di-sulfonic acid or the like.

The diazo-compounds obtained, for example, by means of a mineral acid, especially hydrochloric acid, and sodium nitrite, may be coupled with the aforesaid aminonaphthalene sulfonic acids by methods in themselves known.

The condensation of the resulting amino-monoazo-dyestuffs with cyanuric chloride is carried out in such manner that the condensation product obtained contains two exchangeable halogen atoms, of which one is exchanged in the process of the invention for the radical of an amino-compound of dyestuff character. As examples of such amino-compounds there may be mentioned above all aminomonoazo-dyestuffs of the formula (3)

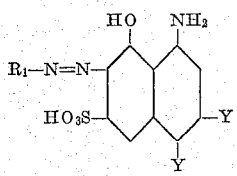

in which one Y represents a hydrogen atom and the other Y a sulfonic acid group, and $R_1$ represents a benzene radical which contains as the sole salt-forming substituent a sulfonic acid group in ortho-position to the azo linkage.

The condensation of these amino-compounds with di-halogen-triazine dyestuffs in the process of this invention is advantageously carried out with the use of an acid-binding agent, such as sodium carbonate or sodium hydroxide, and under conditions such that the finished product contains an exchangeable halogen atom, that is to say, for example, by working in an organic solvent or a relatively low temperature in an aqueous medium.

The invention also provides a modification of the above process for making the disazo-dyestuffs of this invention, wherein an amino-monoazo-dyestuff of the formula

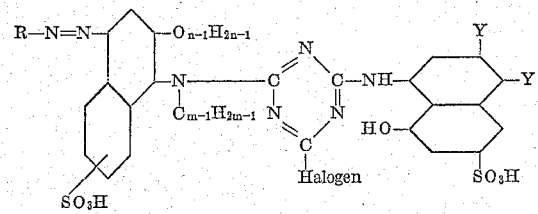

in which R, n and m have the meanings given in connection with Formula 2, and the symbols Y have the meanings given in connection with Formula 3, is coupled with a diazotized aminobenzene-ortho-sulfonic acid.

Without losing their valuable properties, the dyestuffs of this invention can be isolated and worked up into useful dry dyestuff preparations. The dyestuffs are advantageously isolated at a low temperature by salting out and filtration. The filtered dyestuffs may be dried, if desired, after the addition of an extender or buffer such as a mixture of equal parts of monosodium phosphate and disodium phosphate. The drying is advantageously carried out at not too high a temperature and under reduced pressure.

The new dyestuffs are suitable for dyeing and printing a very wide variety of materials such as wool, silk, leather and superpolyamides, but especially cellulosic fibrous materials, such as linen, regenerated cellulose and above all cotton. They are especially suitable for dyeing by the so-called pad dyeing process, in which the goods are impregnated with an aqueous dyestuff solution which may contain a salt, and the dyestuff is fixed by treatment with an alkali, advantageously at a raised temperature. This process and the direct dyeing process, which can be used with many of the dyestuffs of this invention, yield valuable dyeings that are fixed fast to washing, and fast prints are obtained by printing.

The dyeings and prints produced on cellulosic fibers with the dyestuffs of this invention are usually distinguished by their good fastness to light and above all by their excellent properties of wet fastness, especially their very good fastness to washing.

The following examples illustrate the invention, the parts and percentages being by weight unless otherwise stated and the relationship of parts by weight to parts by volume being the same as that of the kilogram to the liter:

Example 1

17.3 parts of 1-aminobenzene-4-sulfonic acid are stirred with 50 parts of ice, and an aqueous solution of 6.9 parts of sodium nitrite in 25 parts by volume of water is added. As soon as the diazotization is finished, a solution of 22.3 parts of 1-naphthylamine-6-sulfonic acid in 400 parts of water, the solution being adjusted to a pH-value of 7, is added to the reaction medium. When the coupling is finished the mixture containing the dyestuff formed is adjusted to a pH-value of 7, and 18.6 parts of cyanuric chloride in a fine state of subdivision are added at 0° C. to the reaction mixture. The condensation is advantageously carried out at a pH-value within the range of 8–6 and at a temperature within the range of 5–10° C. The condensation product formed is precipitated by the addition of sodium chloride and filtered off.

55.5 parts of the primary dyestuff condensation product so obtained is dissolved in 500 parts of water, and a neutralized solution of 31.9 parts of 1-amino-8-hydroxy-naphthalene-3:6-disulfonic acid in 200 parts of water is added. The temperature is adjusted to 40° C. and the pH value is maintained at 5.5 to 6 by the slow addition of a dilute solution of an alkali hydroxide. When the condensation is finished, 30 parts of sodium carbonate are added, and coupling is carried out at 0–5° C. with the diazo compound obtained from 17.3 parts of 1-amino-benzene-2-sulfonic acid. The dyestuff is precipitated with sodium chloride, isolated by filtration and dried. It dyes cellulose fibers fast red tints A dyestuff with similar properties is obtained when 1-aminobenzene-3- or -2-sulfonic acid is used instead of 1-aminobenzene-4-sulfonic acid.

Example 2

22.3 parts of 1-aminonaphthalene-6-sulfonic acid are stirred with 300 parts of cold water and 100 parts of ice, 25 parts of hydrochloric acid of 30% strength are added, and diazotization is carried out with 7.1 parts of sodium nitrite. When the diazotization is finished, a solution of 22.3 parts of 1-aminonaphthalene-6-sulfonic acid in 200 parts of water, the solution being adjusted to a pH value of 7, is run in at a temperature of 5–10° C. In a few minutes coupling is complete.

The dyestuff can be precipitated with sodium chloride. The amino-azo-naphthalene disulfonic acid so formed is condensed in the manner described in Example 1 with cyanuric chloride and the primary condensation product is isolated. This condensation product is suspended in 600 parts of water, and a neutralized solution of 31.9 parts of 1-amino-8-hydroxynaphthalene-3:6-disulfonic acid in 200 parts of water is added. The temperature is adjusted to 40° C. and the pH-value is maintained at 5.5–6 by the slow addition of a dilute solution of an alkali hydroxide. When the condensation is finished, 30 parts of sodium carbonate are added, and the product is coupled at 0–5° C. with the diazo-compound obtained from 17.3 parts of 1-aminobenzene-2-sulfonic acid. The dyestuff is precipitated with sodium chloride, isolated by filtration and dried. It dyes cellulose fibers fast red tints.

By the processes described in the foregoing examples very similar dyestuffs can be obtained by condensing cyanuric chloride, on the one hand, with one of the yellow components given in column I of the following table and, on the other, with one of the second monoazo-dyestuffs obtainable by coupling the components given in column II. The tints of dyeings and prints produced on cotton with the resulting secondary condensation products are given in column III.

| I—Yellow component | | II—2nd monoazo-dyestuff | | III—Tint of dyeing or print produced on cotton with the secondary condensation product |
| --- | --- | --- | --- | --- |
| Diazo component | Coupling component | Aminonaphthol sulfonic acid | Diazo component | |
| 1-amino-2-methylbenzene-4-sulfonic acid. | 1-aminonaphthalene-6-sulfonic acid. | 1-amino-8-hydroxynaphthalene-3:6-disulfonic acid. | 1-aminobenzene-2-sulfonic acid. | Scarlet. |
| 2-aminonaphthalene-4:8-disulfonic acid. | ____do____ | ____do____ | ____do____ | Do. |
| 1-aminonaphthalene-3:6-disulfonic acid. | ____do____ | ____do____ | ____do____ | Do. |
| 2-aminonaphthalene-4:8-disulfonic acid. | ____do____ | ____do____ | 1-amino-5-acetaminobenzene-2-sulfonic acid. | Do. |
| 1-aminobenzene-4-sulfonic acid. | 1-aminonaphthalene-7-sulfonic acid. | 1-amino-8-hydroxynaphthalene-4:6-disulfonic acid. | 1-aminobenzene-2-sulfonic acid. | Do. |
| Do. | 1-amino-2-methoxynaphthalene-6-sulfonic acid. | 1-amino-8-hydroxynaphthalene-3:6-disulfonic acid. | ____do____ | Do. |
| 2-aminonaphthalene-4:8-disulfonic acid. | 1-aminonaphthalene-7-sulfonic acid. | 2-methylamino-5-hydroxynaphthalene-7-sulfonic acid. | 1-aminobenzene-3-sulfonic acid. | Yellow orange. |
| Do. | ____do____ | 2-amino-8-hydroxynaphthalene-6-sulfonic acid. | ____do____ | Red orange. |

*Example 3*

2 parts of the dyestuff of the formula

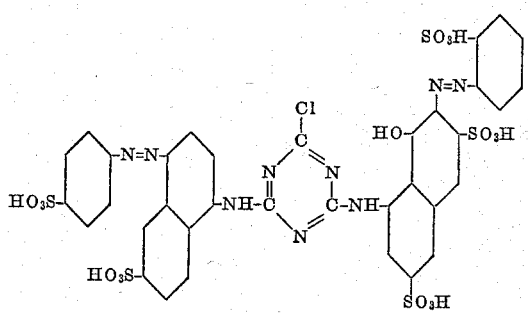

are dissolved in 100 parts of water. A cotton fabric is padded at 60–80° C. with the resulting solution, and the excess of liquid is removed by squeezing until the fabric retains 75% of its weight of dyestuff solution.

The impregnated fabric is dried, then impregnated at room temperature in a solution containing, per liter, 10 parts of sodium hydroxide and 300 parts of sodium chloride, the fabric is then squeezed to a weight increase of 75%, and it is then steamed for 60 seconds at 100–101° C. The fabric is then rinsed, treated with sodium bicarbonate solution of 0.5% strength, rinsed, soaped for ¼ hour at the boil in a solution of 0.3% strength of a non-ionic detergent, and then rinsed and dried. There is obtained a scarlet red dyeing that is fast to washing and light.

What is claimed is:

1. Water-soluble disazo-dyestuffs of the formula

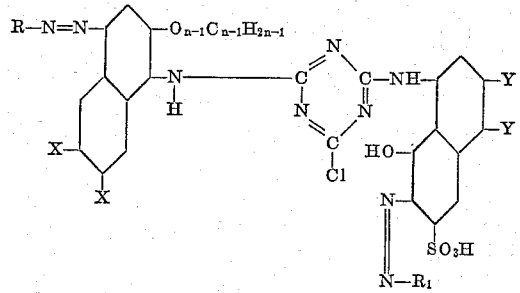

wherein R is a member selected from the group consisting of monosulfophenyl, disulfophenyl, monosulfonaphthyl and disulfonaphthyl; $n$ is a positive whole number of at most 2; $R_1$ is ortho-sulfophenyl; and one of the X's and one of the Y's each represents a sulfonic acid group, the other X and the other Y being a hydrogen atom.

2. Water-soluble dyestuffs of the formula

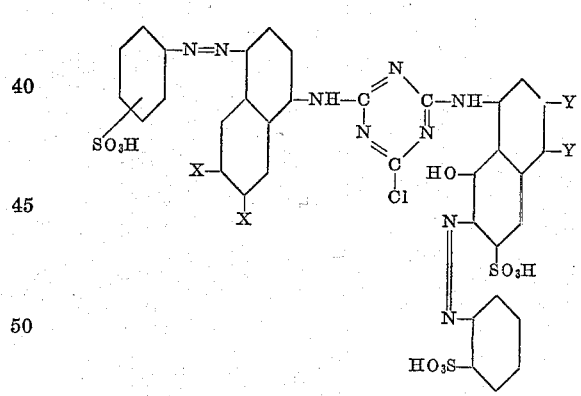

wherein one of the X's and one of the Y's each represents a sulfonic acid group, the other X and the other Y being a hydrogen atom.

3. Water-soluble disazo dyestuffs of the formula

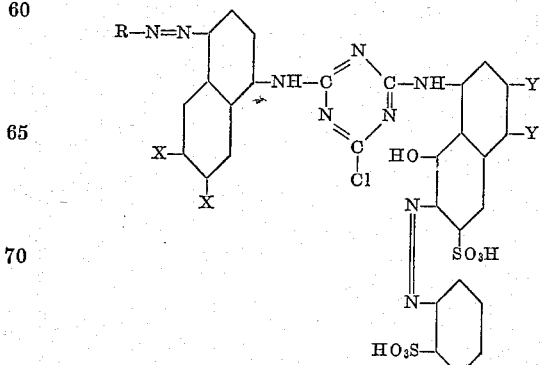

wherein R represents the radical of a naphthalene disulfonic acid containing the sulfonic acid groups as sole substituents, one of the X's and one of the Y's each represents a sulfonic acid group, the other X and the other Y being a hydrogen atom.

4. The disazo dyestuff of the formula

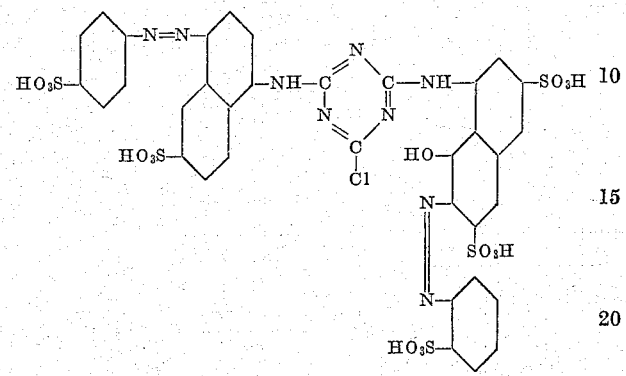

5. The disazo dyestuff of the formula

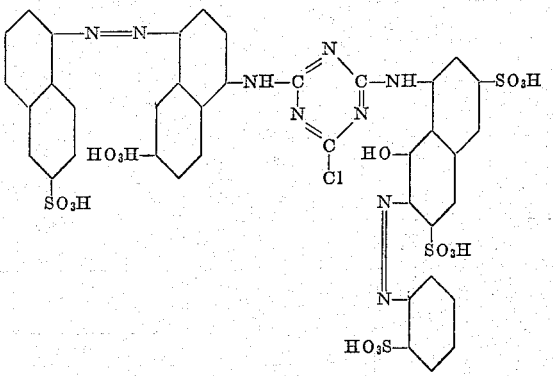

References Cited in the file of this patent

UNITED STATES PATENTS

| | | |
|---|---|---|
| 1,667,312 | Fritzsche et al. | Apr. 24, 1928 |
| 2,892,829 | Stephen | June 30, 1959 |